United States Patent [19]

Eden

[11] 3,804,488
[45] Apr. 16, 1974

[54] LIGHT BEAM SCANNING SYSTEMS AND BEAM SHIFTING DEVICES FOR USE IN SUCH SYSTEMS

[75] Inventor: Dayton D. Eden, Dallas, Tex.

[73] Assignee: Advanced Technology Center, Inc., Grand Prairie, Tex.

[22] Filed: Sept. 28, 1971

[21] Appl. No.: 184,541

Related U.S. Application Data

[63] Continuation-in-part of Ser. No. 817,612, April 14, 1969, abandoned.

[52] U.S. Cl. .............................. 350/160 R, 350/161
[51] Int. Cl. ............................................. G02f 1/28
[58] Field of Search ............ 350/160, 161, 150, 285

[56] References Cited
UNITED STATES PATENTS
3,305,292  2/1967  Miller ................................. 350/150
3,650,602  3/1972  Lee ..................................... 350/161
3,447,855  6/1969  Skinner ............................... 350/150
3,400,992  9/1968  McNaney ............................ 350/160

Primary Examiner—David Schonberg
Assistant Examiner—Michael J. Tokar

[57] ABSTRACT

A light beam scanning system for deflecting a beam of light in mutually perpendicular planes having a first electro-optic device for deflecting the beam in one plane and a second electro-optic device in series with the first for deflecting the beam emergent from the first device in the same or a second plane. An optical device having a planar rectangular body of an electro-optic substance provided with aligned pairs of electrodes on opposite sides thereof which divide the body into serial prism portions through which a beam of light directed on one end of the body passes successively to cause shifting of the angle of the beam as it emerges through the other end of the body.

27 Claims, 13 Drawing Figures

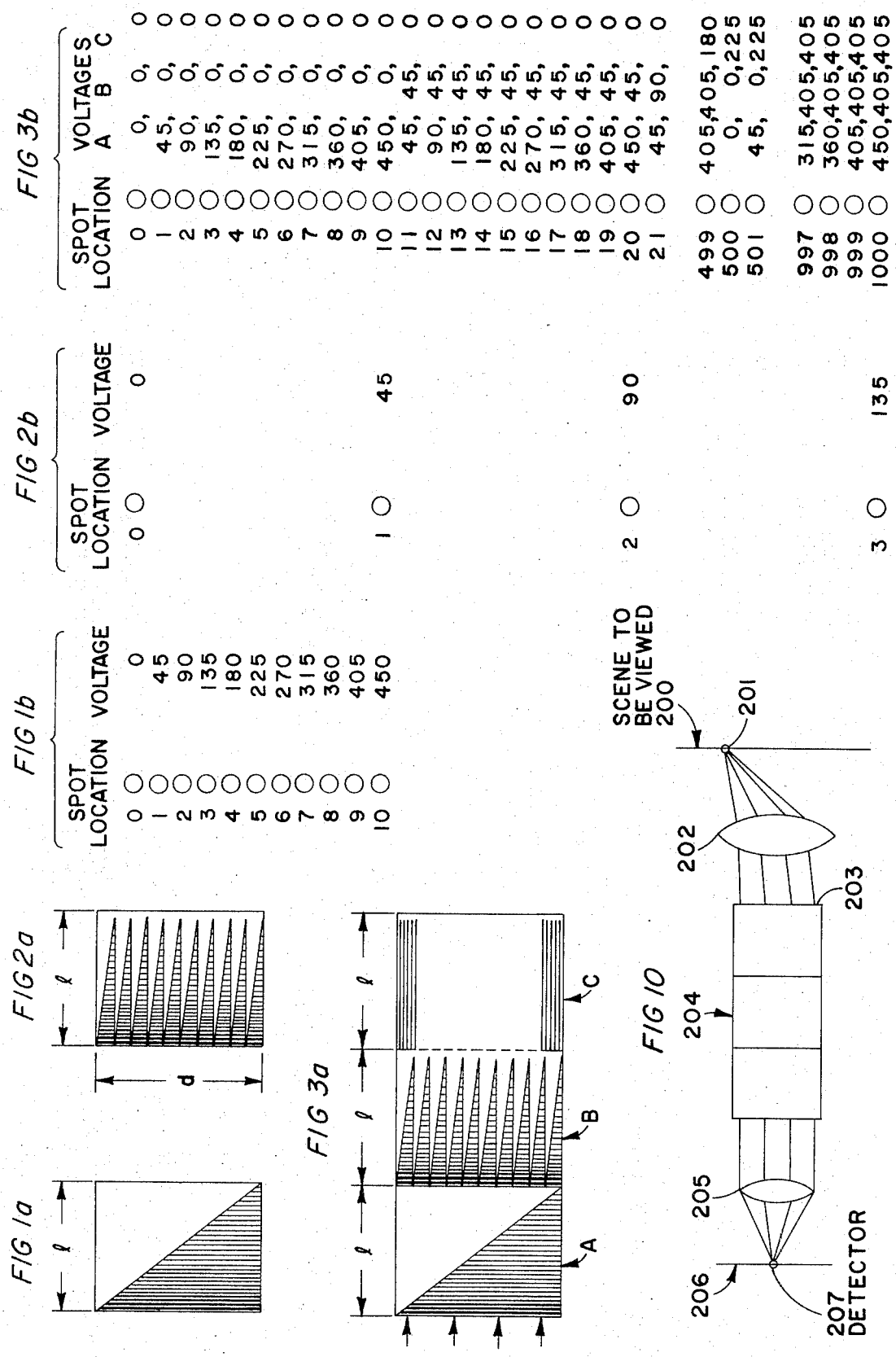

DAYTON D. EDEN
INVENTOR

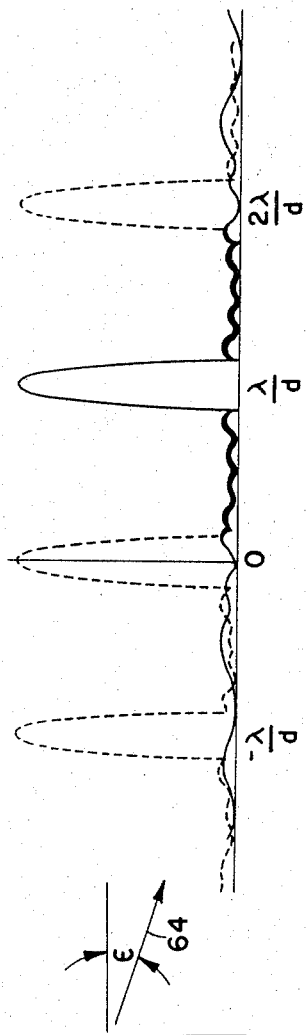
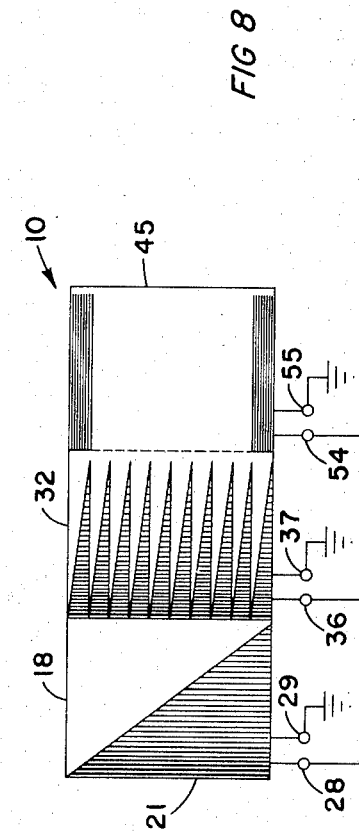
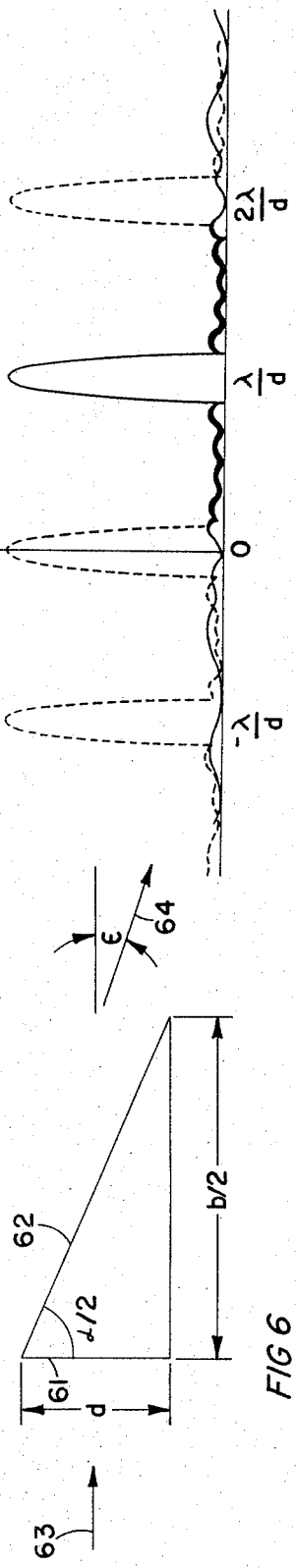
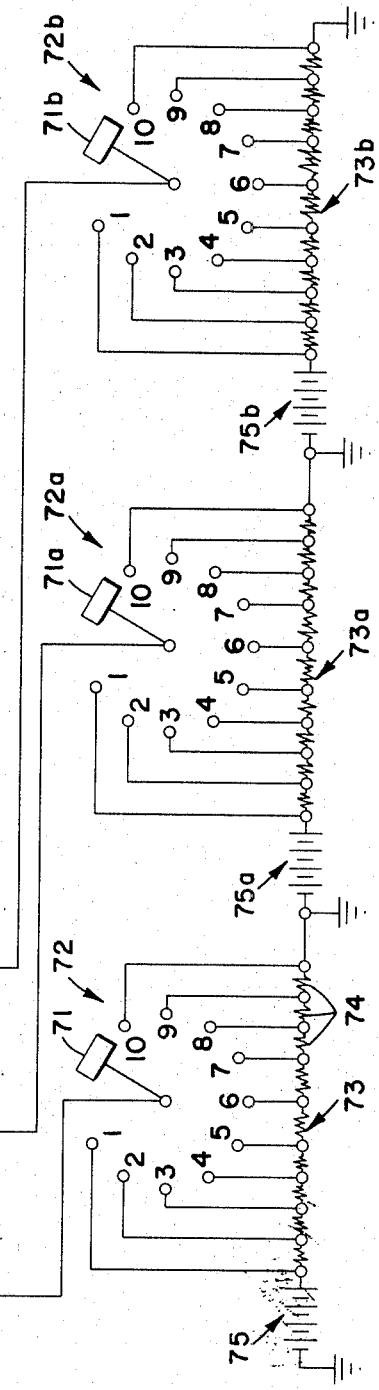
DAYTON D. EDEN
INVENTOR

LIGHT BEAM SCANNING SYSTEMS AND BEAM SHIFTING DEVICES FOR USE IN SUCH SYSTEMS

This is a continuation-in-part of application Ser. No. 817,612 filed Apr. 14, 1969, now abandoned.

This invention relates to light beam scanning systems, and to beam deflecting devices usable in such systems.

U.S. Pat. No. 3,497,285 to Eden describes a light beam scanning system which utilizes a body of electro-optical material having a plurality of triangular electrodes on opposite sides of the body. Each of the two sets of electrodes is electrically inter-connected such that the electrodes function in parallel to selectively shift a light beam passing through the body. While the device disclosed in Pat. No. 3,497,285 was an advance over previously known devices, it is now recognized that certain conclusions expressed therein were based on experiments that did not reveal certain limitations of that invention. Thus, there are certain results which were once thought to be achievable with a single set of parallel electrodes, but which are now known by the inventor to be achievable only with the system to be described herein. Accordingly, the present invention may be considered as an improvement over that disclosed in the earlier patent to Eden.

In describing the earlier invention, the diffraction effects (as the same are typically treated in diffraction gratings) were not discussed because it was not recognized that they would be so significant. The failure to examine the performance of the earlier device as a grating led to certain conclusions that did not correspond to the actual operation of the experimental device. Thus, it is now appreciated that the deflected light will be intensity modulated as a function of deflection (like a grating) to the extent that the quantity of resolved deflection positions achievable with an array of parallel electrodes is, in fact, the same as that achievable with a single pair of electrodes. The significant difference in results between an array of parallel electrodes and a single set lies in the angular spread between the deflection positions. In the case of the plural array, the angular spread is increased and is proportional to the number of parallel electrodes. Now that this is recognized, the present invention provides means to fully exploit this increased spread and to truly maximize the number of resolvable elements in a scanning system.

To help set a predicate for describing this invention, let it first be assumed that a spatially coherent beam of light from some source is directed so that it fills the aperture $d$ of a body of electro-optic material as shown in FIG. 1a. The beam of light will pass essentially undeflected through the body and subsequently can be focused on a display screen as a spot of light. If a voltage is then applied to a set of triangular electrodes on opposite sides of the body, the light can be significantly deflected. If the maximum voltage applied is such that, say, 10 resolvable spots can be produced on a display screen, then it is possible that stepping the voltage up in 10 equal increments can cause the light spot to move progressively from position zero to position No. 10, as shown in FIG. 1b. Assuming the maximum applied voltage is to be 450 volts, each additional increment of 45 volts causes the light spot to be deflected to the next position.

The significant discovery which is reported in Pat. No. 3,497,285 is that if the same sized body of electro-optical material is used (such that the aperture $d$ and the length $l$ are the same), but N sets of electrically connected electrodes are employed instead of one set, then the light deflection is N times that obtainable with one set. If there are 10 sets of electrodes (as shown in FIG. 2a), the light will be deflected 10 times as far with each voltage increment as would be the case with one set of electrodes. As shown in FIG. 2b, a first increment of 45 volts achieves a spot location which could only be achieved at 450 volts with one set of electrodes. Because such greatly increased spatial *distribution* was obtainable with a crystal like that of FIG. 2a, it was assumed that a greatly increased quantity of deflected *positions* could be realized within the new, larger span. However, because of the previously discussed diffraction grating effect, it is now known that an increased quantity of real positions are not obtainable with a single array of several electrodes. A gradually increasing voltage (starting with zero) applied to the crystal of FIG. 2a will cause the light spot at position 0 to fade and finally disappear; naturally, it will disappear more rapidly with an array of many electrodes (e.g., at least 10), since the diffraction effects are more significant as the number of electrodes (and prisms) is increased. As the voltage reaches 45 volts, a light spot will appear at spot No. 1, which is equivalent to the deflection obtained with 450 volts applied to a single set of electrodes. With the crystal of FIG. 2a, then, there is no way to achieve a visible light spot between positions zero and 1 by using some discrete voltage, i.e., by applying a voltage between 0 and 45 to the electrodes.

Accordingly, it is an object of this invention to provide a scanning system for light beams which can deflect light in such a way as to avoid gaps in the display field. To this end, a cascaded arrangement of crystals is provided, a representative example of which is shown in FIG. 3a.

The number of resolvable spots which can be achieved by such a system is given by the relationship $P = b^N$, where $P$ is the number of spots, $b$ is an integer which is characteristic of the number of achievable physical states of the electro-optical material, and $N$ is the number of cascaded crystals. In the example of FIG. 3a wherein N is 3, if the crystals have 10 states which are achievable by stepping the applied voltage up in 10 equal increments, the number of resolvable spots is 1,000. (Actually, it can be somewhat above 1,000, because of additive effects which are described hereinafter.) By establishing the number of electrodes in a plurality of serially arranged crystals such that one of the crystals has a single pair of electrodes, and another has the same quantity of electrode pairs as there are physical states obtainable in the crystals, the achievable spots are optimally dispersed such that there is no overlapping. That is, the relationship $P = b^N$ will be valid regardless of the number of electrodes on a given crystal; but only if there is a particular relationship between the number of electrodes on successive crystals can there be an ideal distribution of spots. It is therefore a further object of this invention to optimize the number of uniquely achievable spots in the plane of a display screen.

Another object of this invention is to provide a new and improved optical device for shifting the angle of a beam of light transmitted through the device.

A still further object is to provide an optical device having successive sections of a planar body of electro-optic substance between a light-entry end and a light-exit end of the body provided with aligned pairs of electrodes extending across the width of the body for applying electric potentials to prism-shaped portions of each body section.

A still further object of the invention is to provide means for applying electric potentials across the electrodes of each of several body sections in predetermined increments to cause the angle of the emergent beam of light to vary incrementally.

An important object of the invention is to provide a new and improved system for deflecting a beam of light in a predetermined manner, and particularly for deflecting the beam in two mutually perpendicular planes whereby the beam of light may be deflected across a planar surface in two dimensions.

Still another object is to provide a scanning system which is of simple structure but which provides results which are more commonly achieved only with rather complex systems.

Other objects and advantages will be apparent from the specification and claims and from the accompanying drawing illustrative of the invention.

In the drawing:

FIG. 1a is a side view of a crystal of electro-optic material;

FIG. 1b is a plan view of the light spot locations which can be achieved by applying various voltages to the single pair of electrodes on the crystal of FIG. 1a;

FIG. 2a is a side view of a crystal like that of FIG. 1a, but having a plurality of aligned electrodes;

FIG. 2b is a plan view of the light spot locations which can be achieved with the crystal of FIG. 2a;

FIG. 3a is a side view of a body of electro-optic material having a plurality of electrodes arranged in such a manner that the single body operates much like three separate bodies acting in sequence on a beam of light passing therethrough;

FIG. 3b is a chart of spot location and voltages across A, B, and C of the respective deflecting elements;

FIG. 6 is a perspective and greatly enlarged view of one of the prism portions of the body illustrated in FIGS. 4 and 5;

FIG. 7 is an illustration of the resultant far-field light intensity distribution (or maxima) in a focused beam of light emergent from a cascaded-prism optical device, the maximum intensity which is shown in solid line being an actual selected maximum, and the maxima shown in broken lines being possible maxima;

FIG. 8 is a schematic and diagrammatic illustration of an electric circuit for applying potential across the pairs of electrodes of the three sections of the body in predetermined progressive increments.

FIG. 10 is a view of the deflector positioned between two lens elements.

Referring initially to FIG. 3a, a unitary body of electro-optic material having a length of $3l$ is shown. It will be assumed that light enters from the left side of the body and exits from the right side, but this arrangement could easily be reversed without changing any effects on the light beam internally of the crystal. Hence, the expressions "light-entry surface" and "light-exit surface" are used herein only for reference purposes in describing the construction of an exemplary device, and are not intended to be limiting. Furthermore, the sequence in which the body portions A, B and C are arranged (by virtue of electrode placement) is not critical; light passing through a unitary body having the electrodes arranged ACB or BAC, etc., will be deflected exactly like it would be with the electrodes arranged ABC or CBA. While the serial order is not important, the number of electrodes in each array of electrodes—be it 1 or 100—is important, and this will be discussed in great detail hereinafter.

Figure 4:
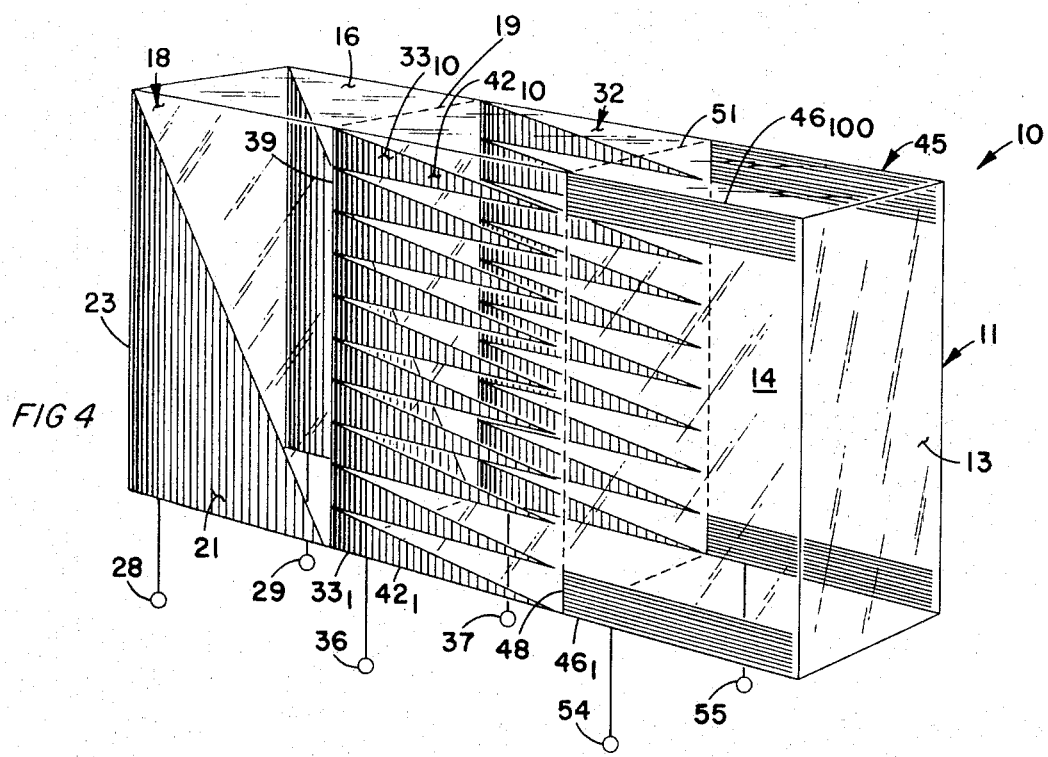
FIG. 4 is a perspective view of an optical device embodying the invention showing one side and one end of the device.
Figure 5:
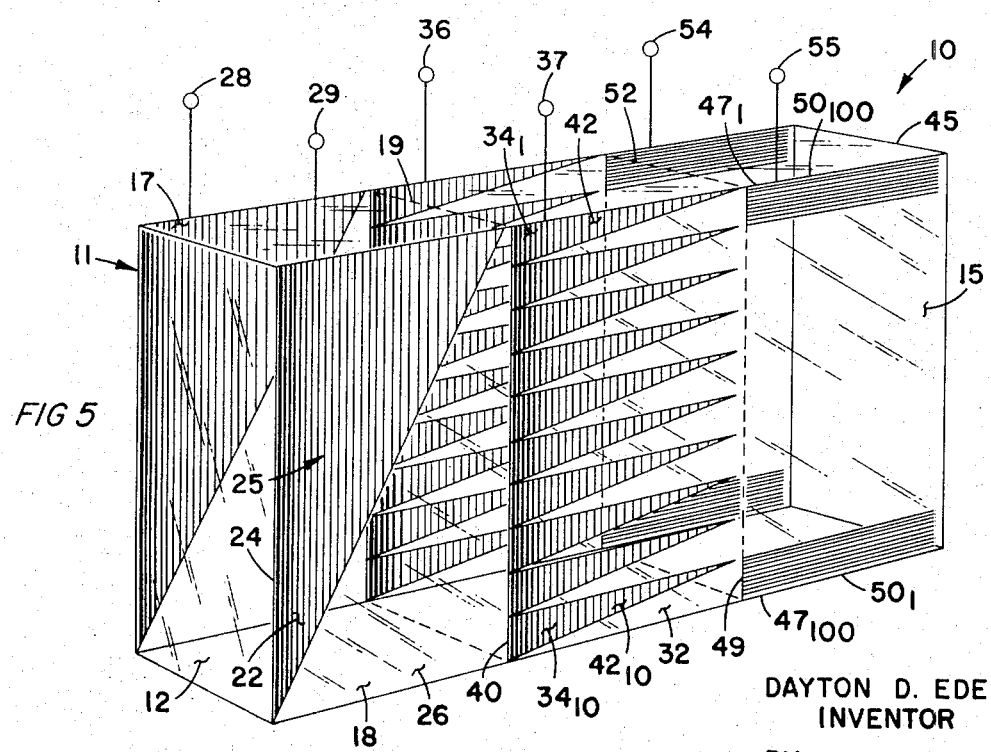
FIG. 5 is another perspective view of the optical device of FIG. 4, this view showing the other side and the other end of the device.

Referring now to FIGS. 4 and 5 of the drawing, an optical device 10 embodying the invention for deflecting a beam of light in a predetermined manner and plane includes a body 11 of electro-optic substance, such as potassium-tantalate-niobate (hereinafter referred to as KTN), potassium dideuterium phosphate (hereafter referred to as KD*P), potassium dihydrogen phosphate, potassium dihydrogen arsenate, tantalum niobate, lithium niobate, barium sodium niobate, etc. The body 11 is of substantially rectangular configuration having a light-entry or front end surface 12, a rear light-exit surface 13, parallel side surfaces 14 and 15, and parallel longitudinal edge surfaces 16 and 17.

A front end section 18 of the body 11 comprises substantially one-third the length of the body and has a rear end which is indicated by the broken line 19. The section 18 has an aligned pair of electrodes 21, 22 of an electrically conductive substance (such as gold and the like) secured to the side surfaces 14 and 15, respectively; the front edges 23 and 24 of the electrodes extend from the front edges of the side surfaces. The pair of electrodes 21, 22 defines a triangular portion or prism 25 in the front portion 18. The prism-shaped portion of section 18 functions exactly as a geometrical prism does when the index of refraction or refractive power of the material is changed relative to the other portion 26 of the front section by applying a voltage across the electrodes 21, 22 using the terminals 28, 29 connected thereto. The index of refraction of the portion 26 remains unchanged since no potential is applied thereacross.

A middle section 32 of the body 11, beginning with the broken line 19 and also shown as being substantially one-third of the length of the body, has an array of aligned pairs of electrodes $33_1$-$34_1$ ... $33_{10}$-$34_{10}$, secured to the side surfaces 14, 15, respectively. The electrodes 33 are electrically connected to each other and, similarly, the electrodes 34 are electrically connected to each other, so that a potential may be applied simultaneously across the aligned pairs of electrodes $33_1$ and $34_1$, ... $33_{10}$ and $34_{10}$ by means of the terminals 36, 37. The front edges 39, 40 of the electrodes 33, 34 extend parallel to the front edges, 23, 24 of the electrodes 21, 22, respectively; and the pairs of electrodes $33_1$ and $34_1$, ... $33_{10}$ and $34_{10}$ define triangular portions or prisms $42_1$ ... $42_{10}$ which extend rearwardly from the front end of the middle portion.

A rear section 45 of the body 11, which is also approximately one-third its length, has another array of aligned pairs of electrodes $46_1$ and $47_1, \ldots 46_{100}$ and $47_{100}$, on the side surfaces 14, 15, respectively. The front edges 48, 49 of the electrodes 46, 47 respectively, are parallel to the front edges 23, 24 of the electrodes 21, 22, such that all of the electrodes are similarly oriented. The pairs of electrodes $46_1$ and $47_1, \ldots 46_{100}$ and $47_{100}$ define triangular portions or prisms $50_1$–$50_{100}$ which extend rearwardly from the front end of the rear body section 45, said front end being indicated by the broken lines 51, 52. The electrodes 46 are electrically connected to each other and, similarly, the electrodes 47 are electrically connected to each other, such that a potential may be applied simultaneously across the aligned pairs of electrodes $46_1$ and $47_1, \ldots 46_{100}$ and $47_{100}$ by means of the terminals 54 and 55.

A light beam entering the body 11 perpendicular to the entry surface 12 thereof is transmitted to the light-entry ends of the prisms 42 with an angle and phase determined by the potential applied across the electrodes 21, 22; and the light beam transmitted through the prisms 42 is directed to the entry ends of the prisms 50 with an angle and phase determined by the potential applied across not only the electrodes 21, 22 but also across the electrodes 33, 34. The light beam which passes through the body portion 45 is transmitted or directed through the light-exit surface 13 at an angle determined not only by the angle at which the light beam is transmitted to the rear ends of prisms 25, 42 but also by the potential applied across the pairs of electrodes 46, 47.

Referring next to FIGS. 6 and 7, a representative prism has an aperture 61 whose height is $d$, a length which is denominated as $b/2$, and light-exit surface 62. The angle between the surfaces 61, 62 is denominated as $\alpha/2$. A beam of coherent polarized monochromatic light 63 which is incident on the surface 61 will be refracted through an angle $\epsilon$ as it exits the surface 62 in the direction of arrow 64. (The angle $\epsilon$ in the drawing is, of course, greatly exaggerated for clarity). If this prism is of electro-optic material and a voltage is applied across the prism, the angle $\epsilon$ can be varied by virtue of a change in the material's index of refraction. If the ratio of the prism's index of refraction to that of its surroundings is $\eta$, then the change in $\epsilon$ per unit change in $\eta$ is given by:

$$\Delta\epsilon/\Delta\eta = (\sin \alpha/2)/\sqrt{1 - \eta^2 \sin^2 \alpha/2}$$

If the prism is surrounded by a medium with identical index (such that $\eta = 1.0$), the change in deviation of the beam as a function of the change in apex angle is advantageously eliminated, i.e., $\Delta\epsilon/\Delta\alpha = 0$ for all apex angles. If $\eta = 1.0$, the ratio $\Delta\epsilon/\Delta\eta$ becomes:

$$\Delta\epsilon/\Delta\eta = \tan \alpha/2 = b/2d$$

An upper limit does exist for $\Delta\epsilon$, namely, it cannot be greater than the angle which is complementary to $\alpha/2$, in order not to exceed the grazing angle. Thus, $\Delta\epsilon \leq \cot \alpha/2 = 2d/b$. The number of resolvable beam positions for such a prism is obtained from the ratio of $\Delta\epsilon$ to one-half of the Fraunhofer far field divergence angle, $\Delta\theta$, where $\frac{1}{2} \Delta\theta \approx \lambda/d$. It follows, then, that the number of resolvable beam positions, P, is given by $P = b\Delta\eta/2\lambda$. The maximum number of resolvable positions corresponds to $\Delta\eta_{max}$, and this is given by $\Delta\eta_{max} = (2d/b)^2$. If, for example, the prism is to have P = 10, then $\Delta\eta$ must be $20\lambda/b$. To examine a representative example, let it be assumed that $b/2$ is 1 cm and $\lambda$ is 5,000A. Then $\Delta \eta = 5 \times 10^{-4}$, and $d$ must be somewhat greater than $b/2 \sqrt{\Delta\eta}$, i.e., greater than $2.23 \times 10^{-2}$ cm. This is a very narrow prism, and it primarily reflects the fact that $\eta$ was chosen to be unity.

The applied electric field necessary to achieve the change in index, $\Delta\eta$, varies with the choice of crystal material; for a representative Pockel's co-efficient of $5 \times 10^{-8}$ cm/volt, it would be $10^4$ volts/cm. The required voltage depends on the thickness dimension of the prism which is shown in elevation in FIG. 6. For a thin film having a thickness of 0.1 mm, the applied voltage is about 100 volts. Again setting the maximum number of resolvable points as 10, the voltage step per light position increment is on the order of 10 volts. This is a value well below the exemplary 45 volts referred to earlier, and is obtainable with many electro-optic materials, such as potassium tantalate niobate, potassium dihydrogen phosphate, potassium dideuterium phosphate and potassium dihydrogen arsenate, tantalum niobate, lithium niobate, and barium sodium niobate, etc. Having discussed the phenomena associated with a single prism, the effects of establishing an array of prisms will now be considered.

A parallel array of prisms, such as the prisms 42 in FIG. 4, may be regarded as a contiguous array of optical apertures whose resultant far field light intensity distribution shown relative to angular deflection is illustrated in FIG. 7.

The spacing between the maxima is $\lambda/d$ where $\lambda$ is the wavelength of the incident light, and the angular width of each maxima is $\lambda/Md$ where M is the number of prisms in an array. It will be understood, of course, that M could be 1, such that the term "array" as used herein should be interpreted broadly enough to occasionally include a single prism. An array, then, consists of M zones lying between M pairs of electrodes. By controlling the angle $\epsilon$, the transmitted beam may be directed through a series of $(2b + 1)$ discrete angles (i.e., 0, $\pm \lambda/d, 2\lambda/d \ldots b\lambda/d$), with each direction corresponding to a maximum in the grating function; the angular spread will be only $\lambda/Md$. The quantity $(2b + 1)$ is associated with the previously discussed number of resolvable points ($b$) obtainable with a single prism, and is based upon the capability of applying either a positive or a negative voltage to the crystal. If there are 10 voltage increments through which a single prism is stepped (i.e., $b = 10$), then there are actually 21 possible resolvable points, including 0, +1, −1, +2, −2, etc. For consistency in this entire discussion, however, it will be assumed that the quantity $(2b+1)$ equals 10. (This could be achieved by having five positive voltage steps, four negative steps, and no voltage, i.e., zero.)

The angle $\epsilon$ can be electro-optically varied over a range of at least $10\lambda/d$, and techniques are available for conveniently fabricating an array of one hundred prisms. Such an array constitutes a digital light scanner having 10 output positions but with a span equivalent to 1,000 positions. That is, a span of $(2b + 1)\lambda/d$ divided by the width of each spot, $\lambda/Md$, shows that $(2b + 1) \times (M)$ spots can be fitted within the span. The quantity $(2b + 1) \times (M)$ may thus be described as the inherent resolution of the system. When $(2b + 1) = 10$ and M = 100, then P = 1,000. While the space for 1,000 resolvable elements may well be available, the next step is to actually direct a beam of light to each potential location. To this end, the embodiment of FIGS. 4 and 5 includes three serial arrays of prisms, with each array having an overall aperture A = Md, which are staged or cascaded to realize all 1,000 of these positions.

It will be recalled that the first array has one prism 25, the second has 10 prisms 42, and the third array has 100 prisms 50. It is expedient to initially examine the performance of the array having the largest number of prisms, since (among other things) this will establish the smallest prism height, $d$, which is referred to during evaluation of the other arrays. The 100-prism array can step the light beam through ten angular positions separated by $\lambda/d$; the separation between positions is equal to 100 times the inherent resolution width of each position ($\lambda/100d$). The 10-prism array can break each of these $\lambda/d$ steps into 10 increments of $\lambda/10d$ each; in series with the 100-prism array, the 10-prism array can fill in every tenth step of the 1,000 step span. The last array, which is just one prism, has an overall aperture of $100d$, and is capable of providing 10 resolvable positions (each having the same width, $\lambda/100d$). This last stage fills in the intervening 10 contiguous steps distributed between the incremental positions ($\lambda/10d$ apart) of the second stage.

For example, if the body 11 is made of a substance such as KTN or KD*P (which have an electro-optic coefficient of $10^{-7}$ cm/volt when operated near their Curie temperatures), and the height between the surfaces 16 and 17 of the body is 2.23 centimeters, and the thickness between the body side surfaces 14 and 15 is 1 millimeter, then the transmitted light (at a wavelength of 5,000 Angstroms) may be directed through a continuous series of 1,000 discrete angles by varying the voltage across each stage in 10 increments of 45 volts each between 0 volts and 450 volts. Of course, a negative polarity as well as a positive polarity, or a mixture of the two, may be employed to achieve a total voltage variance of 450 volts.

It will be apparent that the optical aperture of the prism 25 is 2.23 centimeters, the optical aperture of each prism 42 is 0.223 centimeters, and the optical aperture (i.e., the dimension $d$) of each prism 50 is 0.0223 centimeters.

Having described a representative series of three serial arrays, it is now appropriate to describe the electrical circuitry which can be used to step the voltages referred to above. A schematic circuit for progressively varying the electric potentials across the prisms of the three sections 18, 32 and 45 of the body 11 is illustrated merely by way of example, in FIG. 8. The terminal 28 of the electrode 21 of the front body section is connected to the contact 71 of an eleven step (or position) switch 72 whose 10 stationary contacts are connected to a voltage divider network 73 comprising nine serially connected resistors 74; one side of the network 73 is connected to the positive side of a 450 volt source 75 of direct current and to the number 1 stationary contact of the switch 72. The contacts 2–9 of the switch 72 are connected to the common connections of serially connected adjacent resistors 74, and the last stationary contact number 10 is connected to the opposite side of the voltage divider network. The terminal 29 of the electrode 22 is connected to the negative side of the direct current source 75 (illustrated as a battery) through ground.

The terminals 36, 37 of the electrodes of the middle-body section 32 and the terminals 54, 55 of the electrodes of the rear-body sections 45 are similarly connectable across the direct current sources 75a and 75b, respectively, by similar switches 72a and 72b and voltage divider networks 73a and 73b, respectively. Each voltage divider network has one end connected to the positive side of its battery and its other end to ground to provide the desired voltages at the stationary contacts of its associated switch.

Assuming now that it is desired to scan a beam of properly polarized monochromatic coherent light which is incident substantially perpendicularly to and on the end surface 12, the beam of light which emerges from the end surface 13 of the body may initially be deflected downwardly to its greatest angle from the horizontal by moving the movable contacts of the three switches to their number one contact. The electrodes of the three body sections on the opposite sides of the body and the prisms defined thereby now have maximum voltages of 450 volts applied thereacross, and the difference between the refractive indices of the prism portions and of the portions of the body not disposed between aligned pairs of electrodes is now at a maximum. As a result, the emergent beam of light is deflected to its lowermost angle from the horizontal. (Using the same scale for measuring deflection as was described in connection with FIG. 3b, the deflection obtained with 450 volts on all three sections would cause a spot to be located at position No. 1110 — because the deflection angles are additive, i.e., 1,000 plus 100 plus 10).

The movable contact 71 of the switch 72 is now moved toward the number 2 stationary contact and engages it before it disengaged from the number 1 contact, and the potential across the electrodes 21, 22 drops 45 volts to 405 volts; as a result, the emergent beam moves upwardly a discrete small angle. As the rotation of the movable contact 71 is continued and as each succeeding stationary contact of the switch 72 is engaged by the movable contact (before the movable contact disengages from the immediately preceding stationary contact), the voltage across the electrodes 21, 22 is progressively reduced by steps of 45 volts until the movable contact moves out of engagement with the stationary contact 10 of the switch 72; concurrently, the direction of the emergent beam of light changes by 10 successive and equal discrete angles. The movable contact 71a of the switch 72a is then moved, while the movable contact 71 of the switch 72 continues to be moved, to cause the contact 71a to engage the number 2 stationary contact of the switch 72a at the same time the switch contacy 71 again engages the number 1 stationary contact.

Since the discrete angle by which the emergent beam moves upwardly upon a 45 volt decrease in the potential applied across the prisms 42 is 10 times the discrete angle by which the emergent beam moves upwardly upon a similar voltage decrease across the prism 25, the movable contact 71a is left temporarily at contact number 2 while movable contact 71 continues to be rotated. Upon each complete rotation of the movable control 71, the movable contact 71a is advanced one step; by using these two controls, the angle of the beam can be raised progressively by 100 successive equal discrete angles. Continuing, as the contact 71a is moved to engage its number 3 stationary contact, the contact 71b is rotated so as to engage its number 2 contact and to disengage from its number 1 contact at a time to correspond with movement of contacts 71, 71a. Since the angle by which the emergent beam moves up upon a 45-volt decrease in the potential across the prisms 50 of the rear section is 10 times as great as the angle by which the emergent beam moves upwardly upon a similar decrease in the voltage across the prisms 42 of the middle section, the contact 71b is not moved from one contact to the next until the contact 71a has made ten revolutions.

The sequential step-by-step rotation of the contact 71, followed by step-by-step rotation of the contact 71a upon the completion of successive revolutions of the contact 71, followed by the step-by-step rotation of the movable contact 71b upon the completion of successive revolutions of the movable contact 71a, is continued until the movable contacts are again in the positions illustrated in FIG. 8; at that time, no potentials are applied across any of the electrodes, and the emergent beam has moved by over 1,100 discrete equal angles from its greatest deflection back to a horizontal position. The indices of refraction of the prism portions (defined by the pairs of aligned electrodes) are now equal to that of the body portions not lying between such pairs of electrodes.

For purposes of explanation a particular manually operable electrode electric circuit has been illustrated and described which is suitable for progressively and sequentially varying the potentials across the prisms of the three body sections in predetermined sequence; but it will be apparent that electronic switching circuits driven by suitable electronic clocks could also be employed for this purpose in practical application of the optical device embodying the invention.

It will further be seen that the use of a single integral body 11 (selected portions of which are caused to act as prisms) provides for great control of the movement and positioning of the emergent beam and minimizes the loss of light transmitted through the device. A significant part of this is attributable to the fact that there are no separate surfaces at the interfaces of the prisms with the other portions of the body which could cause reflection and scattering of the light. While an integral body 11 having two or more serially arranged portions (e.g., portions 18, 32, 45) is advantageous in minimizing loss of light, and is characterized by excellent mechanical stability, it would be possible to arrange two or more separate bodies in the same way that the described portions are arranged in order to achieve similar results.

Too, while a particular means for changing the refractive powers of the prisms has been illustrated and described, any other suitable means for changing the refractive powers of the prisms may be used.

It will also be apparent that while for purposes of explanation a body 11 of a particular electro-optic substance and having particular dimensions (in part dictated by the properties of the particular substance) has been illustrated and described, the body could be formed of other electro-optic substances and be of different configurations and different dimensions. To maximize the number of resolvable spots, however, it is appropriate to observe certain relationships between the cascaded sections. To decide how many prisms should be in each section, a given material is first evaluated to determine the number of physical states which can reasonably be established in a material. In the example above, the electro-optical material could be put into ten discrete states by applying 10 different voltages to the electrodes affixed thereto. This number of states (i.e., 10) is used to establish the number of parallel electrodes (and thus prisms) in one of the cascaded sections, and this number also becomes the base upon which the optimum number of electrodes in other sections may be determined. Among a plurality of sections, one section should have only a single pair of electrodes. If three sections are to be cascaded, the number of pairs of electrodes in the third section should be the square of the base number; if a fourth section is to be added, the base number is raised to the third power to establish the optimum number of prisms. For example, if the base is 10, three sections should be designed to have 1, 10, and 100 prisms, respectively. If in fact the sections have 1, 9, and 100 prisms, respectively, the system will still be operative; but there will be some gaps in the image plane where a spot of light is not achievable (because of certain diffraction effects), just as there are gaps with the device disclosed in the earlier Eden patent. As a further example, if the base is 3 and there are to be four sections, they should be designed with 1, 3, 9, and 27 prisms, respectively. For an embodiment with N cascaded sections, each of which has $b$ physical states, then the respective sections should have a quantity of prisms equal to $b$ raised to the S-1 power, where S is the number designation of the particular section under consideration. Thus, for the first of four sections (i.e., S = 1), there should be $b^0 = 1$ prism; for the second of these four sections (i.e., S = 2), there should be $b$ prisms; for the third section (where S = 3), there should be $b^2$ prisms; and for the fourth section, (S = 4), there should be $b^3$ prisms.

Figure 9:
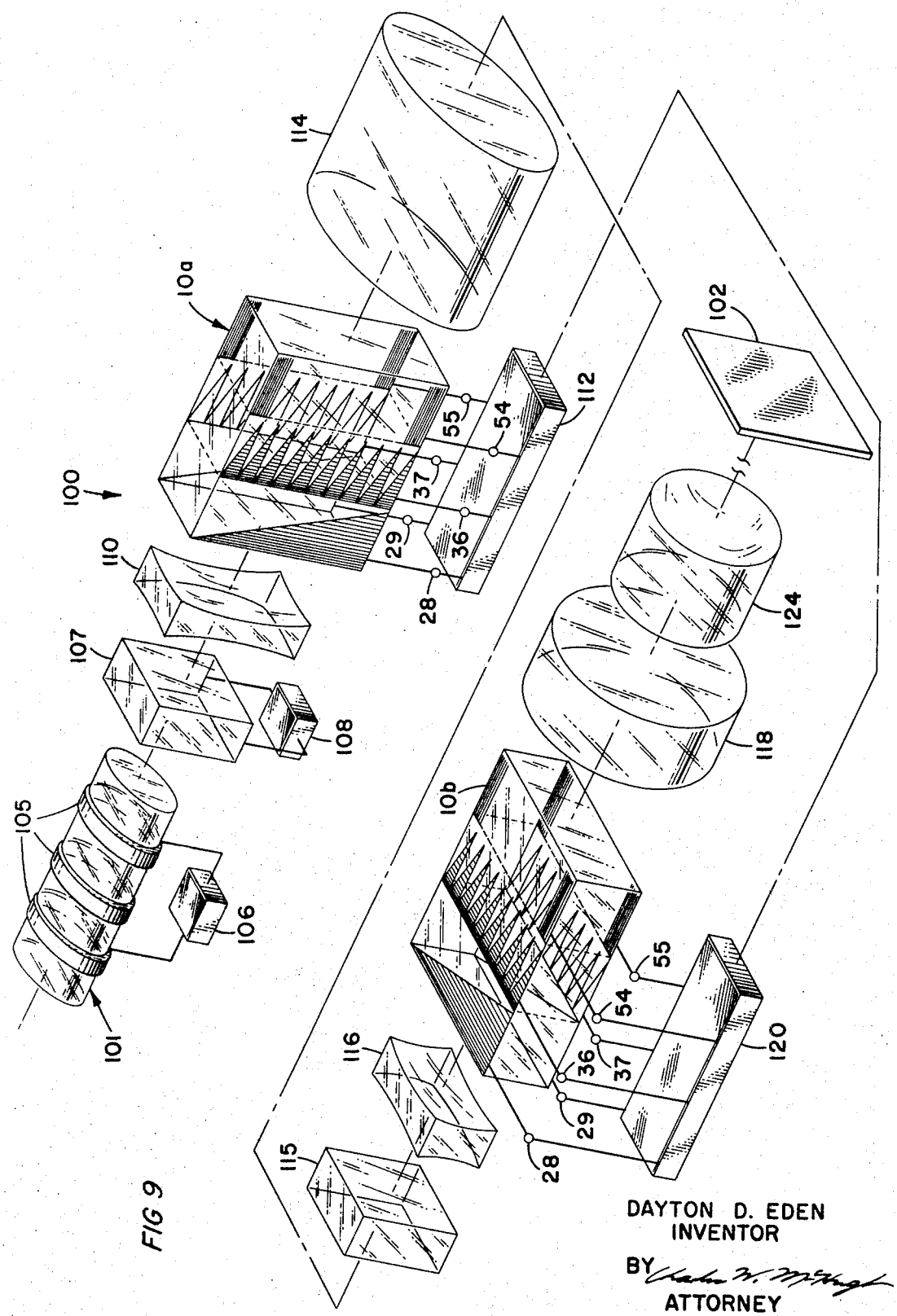
FIG. 9 is a schematic perspective view of a light beam scanning system embodying the invention.

Referring now particularly to FIG. 9 of the drawing, a light beam scanning system 100 embodying the invention employs two optical devices 10a and 10b of the type described above for deflecting or scanning a beam of light produced by a laser 101 in two mutually perpendicular planes over the surface of a transparent screen, photographic film or other light sensitive means, or other desired plane over which it is desired that a light beam be scanned.

The source of coherent illumination may be of any suitable type, as, for example, a gas continuous emission laser 101 which is excited by an electric potential applied to its electrodes 105 from a suitable source 106. The beam of coherent polarized monochromatic light of small cross sectional dimension produced by the laser 101 is transmitted to the rectangular light entry end of the scanning device 10a through a light modulator 107 of any suitable type and operable by a suitable control means 108 in response to signals (e.g., a television video signal or binary data signals) transmitted thereto from a suitable source. The modulated beam of small cross sectional area is expanded by a suitable optical lens or lens system 110 into a rectangular beam of substantially the same dimensions as the light entry end of the scanning device 10a and directs it substantially perpendicularly thereto. The beam of light transmitted through the scanning device 10a is deflected as it emerges from the light exit end thereof by potentials applied to the electrodes of its three sections by a suitable vertical scan signal generator or control 112. The control 112 is capable of applying three separate and independently variable potentials to the electrodes of the three sections. The plane of polarization of the light naturally is such that the potentials applied across the prisms will deflect the light as it passes therethrough.

The beam of light emerging from the device 10a, whose angle with respect to the horizontal is capable of being discretely varied, is then transmitted through a collimating lens system 114 which again collimates the beam into a small cross-sectional area. The collimated beam from the lens system 114 is transmitted through an optical device 115 which rotates the plane of polarization of the light through 90° and then through an expander lens system 116 which expands the beam of light into a rectangular beam, preferably of somewhat smaller width than the width of the scanning device 10b. The effect will be that as the vertical angle of the beam changes, it will still pass through the scanning device to a collimating lens system 118.

During the transmittal of the vertically shifting beam through the second scanning device, the angle of the emergent beam relative to a vertical plane is caused to vary by virtue of potentials applied across the aligned pairs of electrodes in the device 10b. These potentials are supplied by a horizontal scan control means 120. The horizontal and vertical scan control means 120, 112 include means for synchronizing their operation in a manner to be explained below.

The emergent beam of light from the scanning device 10b (which is now shifting angularly in both the vertical and horizontal planes) is transmitted through the collimating lens system 118 and to a lens system 124 which amplifies the angular deflection or scanning of the beam and causes it to scan the planar surface of the target 102 both vertically and horizontally over a predetermined rectangular area thereof.

It will be readily understood that the vertical and horizontal scan control means may cause the beam to advance by discrete distances to predetermined horizontally spaced positions in vertically spaced lines; if the target means is a light responsive or sensitive film or data storage means, then binary bits of data may be stored at predetermined positions as determined by the modulator 108. Subsequent retrieval may be accomplished by a suitable means, as, for example, a similar (or the same) scanning device which would direct the beam of light successively at the positions on such developed film. The beam, of course, shines through locations where the film had been previously exposed to light for detection by suitable sensor means.

It will also be apparent that the target means may be a transparent screen on which a picture or various symbols, data and the like may be delineated by the light beam as it scans the screen.

It will be seen that the use of a source of internal, coherent monochromatic light such as a laser, permits the beam tracking the target means 102 to be of relatively great intensity even though some light is lost during the movement of the beam through the various components of the scanning system.

It will further be seen that the optical device 10 is capable of scanning light into and through a relatively large number of discrete angular positions wherein each discrete angular direction is separated from its nearest adjacent positions by an angle which is large relative to the angular resolution of the device.

Because all of the light ray paths described above (in connection with use of the optical device as a transmitting light scanner) are reversible, the device can also be used in combination with a detector as a scanning optical receiver. In such a case, the detector would logically take the place of the equivalent point source which is inplicit in the operation of the device when used as a scanning transmitter. Control of the voltage of the electrodes would dictate the specific resolution element "viewed" by the system. Correlation between voltages and resolution elements is obtained by temporarily placing a laser or the like at a position such that it is equivalent to a point source of light in combination with a collimating lens, and subsequently recording the output location with each voltage combination. Replacing the laser with a photodetector-lens combination and applying an appropriate voltage will then establish an optical path between a resolution element (point source of light) and the photodetector. The incidence of a focused beam of light onto the photodetector will naturally cause a signal to be generated which can be monitored. Changing the voltage will move the focused beam of light away from the photodetector and the electrical output will drop to zero until the electrode voltages are such as to again establish an optical path between another point source of light and the fixed photodetector. In effect, then, a scene can be scanned in this way to convert the white, blacks and grays of a scene into a time-varying electrical signal indicative of the scene. This is analogous, of course, to well-known TV scanning systems.

Operation of the system in the above manner is shown in FIG. 10. A scene plane 200 has a typical point source of light 201 which is to be identified with the resolved spatial element of an actual scene. A collimating lens system 202 directs the light from point source 201 onto the light entry surface 203 of a body 204 made of material whose index of refraction is controllable by external means (e.g., voltage, magnetic field, light, etc.). The electro-optic effect will again be used as exemplary of the preferred techniques. By adjusting the voltages on the body 204, the light beam can be focused by lens system 205 to a point in plane 206. A fixed photodetector 207 lies in plane 207, and provides a signal when there is an optical path between a source in plane 200 and the photodetector.

It is apparent that other variations and modifications may be made without departing from the present invention. Accordingly, it should be understood that the forms and steps of the present invention described above are illustrative only and not intended to limit the scope of the invention as defined by the claims.

What is claimed is:

1. In a system having a source of spatially coherent light, a deflector for a beam of said light which comprises:
   a. a transparent medium having a light-entry surface and a light-exit surface, and said light-entry surface having a given aperture in the path of said beam, and the transparent medium having a controllable index of refraction;
   b. first means for varying the index of refraction of a first portion of said transparent medium through which the beam passes, said means including a first array of A zones having triangular cross sections; and
   c. second means for varying the index of refraction in a second portion of said transparent medium through which the beam passes, said means including a second array of B zones having triangular cross sections, with A and B being nonequal integers, and said second array being located such that the beam passes serially through the first and second arrays.

2. The combination set forth in claim 1 and further including third means for varying the index of refraction of a third portion of said body through which the beam passes, said third means including an array of C zones having triangular cross sections, with A, B and C being non-equal integers, and said third body portion being located such that the beam passes serially through the first, second and third arrays.

3. The combination set forth in claim 2 wherein A is one, B is 10 and C is 100.

4. The combination set forth in claim 2 wherein A is one, B is an integer which is derived from the body's indices of refraction, and C is the square of B.

5. The combination set forth in claim 2 wherein the number of zones in each of a plurality of arrays is given by the value $b^{(s-1)}$ wherein $b$ is an integer which is characteristic of the body's indices of refraction and $S$ is the series number of the respective array in said plurality of arrays.

6. The combination set forth in claim 1 wherein said body is formed of material from the class consisting of potassium tantalate niobate, potassium dihydrogen phosphate, potassium dideuterium phosphate, potassium dihydrogen arsenate, lithium tantalate, tantalum niobate, lithium niobate, and barium sodium niobate.

7. The combination set forth in claim 1 wherein said body is of electro-optical material and said first and second means for varying the index of refraction of portions of said body comprise means for selectively varying the electric potential across each of said first and second body portions.

8. In a light-scanning system, the combination comprising:
a. a spatially coherent light source for providing a beam of light;
b. a crystal of electro-optical material located in the path of light from said source, said crystal having one face which is perpendicular to the light path and constituting an aperture;
c. a first array of M pairs of triangular electrodes, with each pair being on two opposite faces of said crystal which are parallel to the direction of light propagation, each of said electrodes having one side parallel to and the other side perpendicular to the plane of the aperture, and the electrodes being similarly oriented such that corresponding sides of the electrodes are aligned with one another in a common plane;
d. means for applying a potential to said first array of M pairs of electrodes to locally vary the index of refraction of said crystal in a prism-shaped zone between each pair of electrodes;
e. a second set of N pairs of triangular electrodes on the same crystal faces as the first set, with M and N being different integers, said second set being disposed in a region adjacent the first set and spanning the light beam, whereby the beam of light entering the aperture passes sequentially between the first set of paired electrodes and between the second set of paired electrodes; and
f. means for applying a potential to the second set of electrodes to locally vary the index of refraction of said crystal in prism-shaped zones between the second electrodes.

9. The combination set forth in claim 8 and further including means for focusing the light beam emergent from the crystal to a spot in a plane.

10. The combination set forth in claim 9 wherein the means for applying a potential to the electrodes comprises means for applying a stepped voltage in increments appropriate to cause a focused spot to be translated by one spot diameter.

11. In a system having a source of spatially coherent light, a deflector for a beam of said light, comprising:
a. a body having a given aperture in the path of said beam and having a controllable index of refraction, and the body being generally transparent to said light;
b. means for varying the index of refraction of localized zones of said body, said zones including at least two serially arranged regions, and each of said regions having an array of means which are selectively operable to deflect the light passing therethrough in a first direction, and the array of means in each region being adapted to deflect the light passing therethrough in the same direction but by a greater angle than does the means in an adjacent region;
c. a second body having a given aperture slightly larger than the aperture of the first body, and said second body having a controllable index of refraction;
d. means for directing the beam emergent from said first body to said second body;
e. means for varying the index of refraction of a group of localized zones of said second body, said zones including at least two serially arranged regions, each region having means which are selectively operable to deflect the light in a direction orthogonal to said first direction; and
f. means for focusing the beam of light emergent from the second body at a spot of given diameter in a plane.

12. In a system as claimed in claim 11, the addition of means for varying the indices of refraction of the bodies such that the focused spot can be translated by a distance as small as one spot diameter and at least as large as 100 diameters.

13. The method of diffracting a beam of spatially coherent light, comprising the steps of:
a. passing the light beam serially through each of a plurality of electro-optic material sections, with each of said sections having the same sized apertures and each section having triangularly shaped electrodes applied to opposite sides of the sections, whereby prism shaped zones having an index of refraction different from the remainder of the electro-optic material are obtainable, and each of the sections having triangular electrodes whose lengths are substantially the same but whose bases are different from those in other sections, and the combined bases of the prisms in a given section substantially filling a respective aperture, whereby different sections are adapted to deflect the light beam by different amounts; and b. selectively varying the index of refraction of at least one of the plurality of sections by applying a voltage across said electrodes, such that the direction and phase of the light beam is affected as it passes serially through the plurality of material sections.

14. The method of diffracting a beam of spatially coherent light as claimed in claim 13 wherein the light emergent from said electro-optic material sections is subsequently passed through a second group of electro-optic material sections having an orientation such that the direction of the beam of light is changed in a plane which is substantially perpendicular to the plane in which the first group of electro-optic material sections moves the beam.

15. The method as claimed in claim 13 wherein the amount by which the direction of said beam of light is diffracted by a second one of said electro-optic material sections is greater by a certain factor than the amount by which a first one of said electro-optic material sections operates to diffract the light beam for a given increment of voltage, and including the further step of selectively stepping up the voltage across the first of the two sections until a diffraction is achieved which is equivalent to that obtainable with the given increment of voltage applied to the second of the two sections.

16. An optical device, comprising:
 a. A rectangular parallelepiped of electro-optic substance having a light-entry surface at one end thereof and a light-exit surface at the other end thereof;
 b. a first pair of triangular electrodes on two opposite sides of said parallelepiped with one leg of each triangle being parallel to the light-entry surface, said triangles defining therebetween a first triangular prism having a base which coincides with the light-entry surface and having an apex which is intermediate the ends of said parallelepiped;
 c. an array of second pairs of triangular electrodes on the same sides of the parallelepiped as the first pair, said second pairs having their legs parallel to the legs of the first pair of electrodes, and the second pairs of electrodes defining a plurality of prisms having bases which in total equal the area of the base of the first triangular prism, whereby a beam of light filling the light-entry surface passes serially through the first triangular prism and the second triangular prisms; and
 d. first means for varying the electrical potential across said first prism, and second means for varying the electrical potential across said second prisms.

17. The optical device as claimed in claim 16, wherein said first means for varying the electrical potential across said first prism includes means for varying said potential progressively by increments to progressively shift the maxima of the far field diffraction pattern of a beam of light emergent from said parallelepiped.

18. An optical device including:
 a. a parallelepiped body of an electro-optic substance having a light-entry surface at one end thereof and a light-exit surface at the other end thereof;
 b. a first pair of substantially triangular aligned electrodes on two opposite sides of said body extending from one end of said body and defining a first triangular prism portion of said body therebetween, said prism portion having a base which extends substantially the full width of said body at said one end and decreases progressively in width to an apex at one edge of said body intermediate said ends of said body;
 c. a plurality of aligned second pairs of substantially triangular electrodes on the same sides of said body as the first pair, said second pairs extending across said sides and defining a plurality of second triangular prism portions of said body therebetween, said second prism portions having bases extending substantially parallel to said base of said first prism portions; and
 d. a plurality of aligned third pairs of substantially triangular electrodes on the same sides of said body as the first pair, said third pairs extending across said sides and defining a plurality of third triangular prism portions of said body therebetween, with each of said third prism portions having bases extending substantially parallel to and in alignment with the bases of said second prism portions, and the quantity of third prism portions being different than the quantity of second prism portions, whereby light entering the body perpendicular to the light-entry surface passes serially through the first, second and third prism portions.

19. The optical device of claim 18 wherein each of said first, second and third prism portions is adapted to deflect light transmitted therethrough through more than two angular positions.

20. The method of scanning a beam of coherent light by passing the beam serially through a plurality of cascaded crystals, each crystal providing an array of prisms having a variable index of refraction, and at least two of said crystals having different deflection capabilities because of having different quantities of parallel and contiguously positioned prisms, and subsequently focusing the beam to a resolvable spot at a selected one of P possible spots in a plane in accordance with the relation:

$P = b^N$ where
 $P =$ the number of resolvable spots
 $b =$ an integer which is derived from the number of physical states in the crystal which are characterized by having significantly different indices of refraction, said integer being the same as the number of resolvable positions obtainable with a single prism, and
 $N =$ the number of cascaded crystals
and including the step of applying variable external forces to the crystals to change their respective indices of refraction and thus cause the focused beam of light to impinge upon a selected one of the P spot locations.

21. The method of scanning a beam of light as claimed in claim 20 wherein b is at least 10 and N is at least 3, such that the number of resolvable spots is at least 1,000.

22. The method of scanning a beam of light as claimed in claim 20 wherein each of the crystals are electro-optic crystals and the variable external forces applied to the crystals are variable voltages.

23. The method of detecting the presence of light at a particular one of a plurality of locations, comprising the steps of:

a. directing light from an individual one of a plurality of point sources of light through a means of establishing a collimated beam, with said point sources of light being at certain ones of the plurality of locations;

b. directing the collimated beam onto a light-entry surface of a body of electro-optic material having a plurality of cascaded prism portions therein, said prism portions being achievable by applying appropriate voltages to triangular electrodes on opposite sides of the body, and at least one of the prism portions including an array of parallel prisms through which the beam passes;

c. focusing the beam of light which passes through the body to a point in a plane;

d. sensing the presence of light with a photodetector positioned at a fixed point in the plane whenever the voltages applied to respective electrodes are appropriate to establish an optical path between any one of the point sources of light and the photodetector; and e. correlating the sensed signal indicative of the presence of light at the detector with the voltages that are applied to the electrodes such that the location of the point source of light is determinable.

24. The method of detecting the presence of light as claimed in claim 23 wherein the plurality of point sources of light constitute parts of a 3-dimensional scene to be scanned, such that the resolved spatial elements in the scene are sequentially scanned and converted by the photodetector into a time-varying electrical signal.

25. In a system having a point source of radiant energy at a given location, a means for collimating a beam of energy from the source onto a light-entry end of a single crystal, said crystal having a plurality of cascaded prism portions therein, and said prism portions having indices of refraction which can be varied so as to deflect a beam of radiant energy through at least 1,000 discrete angles, and means for changing the index of refraction of the prism portions by applying discrete forces to the same, and said crystal having a light-exit end from which the beam can exit, the method of:

a. initially scanning a beam of radiant energy derived from the point source through a field of view from the light-exit end of the crystal, said field of view spanning each of the at least one thousand discrete angles, and said scanning being effected by applying discrete forces to the prism portions of the crystal;

b. correlating the achieved beam angles with each of the discrete forces applied to the crystal;

c. subsequently replacing the point source of radiant energy with a means for detecting the incidence of radiant energy; and d. subsequently applying discrete forces to the crystal and correlating said forces with any signals generated by the means for detecting radiant energy, whereby radiant energy which is generated by random sources in the field of view of the crystal and which enters into said crystal through what was originally the light-exit end will energize the means for detecting radiant energy at such time as an appropriate force creates an optical path between the random source and the means for detecting radiant energy.

26. A device for use in the deflection of a beam of light, comprising:

a. a body of electro-optic material, said body having a longitudinal axis which extends between a light-entry surface and a light-exit surface, and the light-entry surface having an aperture with a given height;

b. a first pair of electrodes affixed to two opposite sides of the body, each of said electrodes being in the shape of a right triangle whose base is coextensive with the height of the aperture, and each electrode having a leg which is parallel to the longitudinal axis of the body, whereby a prism-shaped portion of the body lies between the first pair of electrodes;

c. a second pair of electrodes affixed to two opposite sides of the body and being arranged such that a light beam passing longitudinally through the body will pass serially through the first and second pairs of electrodes, and said second electrodes having a generally saw-tooth shape, with the teeth consisting of an array of congruent, juxtaposed right triangles, with the quantity of teeth in the array being at least 10, and each of the triangular teeth having a leg which is parallel to the longitudinal axis of the body, and the height of each second electrode being substantially the same as the height of the aperture.

27. The device for use in the deflection of a beam of light as claimed in claim 26, and further including:

a. a pair of third electrodes affixed to two opposite sides of the body and being arranged such that a beam of light passing through the body will pass serially through the first, second and third pairs of electrodes, said third electrodes having a generally saw-tooth shape with the teeth consisting of an array of congruent, juxtaposed right triangles, and each of the triangular teeth having a leg which is parallel to the longitudinal axis of the body, and the height of each third electrode being substantially the same as the height of the aperture, and the quantity of teeth in the third array of teeth being equal to the square of the number of teeth in the array of the second electrode.

* * * * *